(12) United States Patent
Reijersen Van Buuren

(10) Patent No.: US 8,522,513 B2
(45) Date of Patent: Sep. 3, 2013

(54) AGRICULTURAL SYSTEM TO FORM AND WRAP BALES OF CROP MATERIAL

(75) Inventor: Willem Jacobus Reijersen Van Buuren, Dirksland (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 13/456,230

(22) Filed: Apr. 26, 2012

(65) Prior Publication Data

US 2012/0210886 A1    Aug. 23, 2012

Related U.S. Application Data

(63) Continuation of application No. PCT/NL2010/000151, filed on Oct. 21, 2010.

(30) Foreign Application Priority Data

Nov. 4, 2009    (NL) ..................................... 1037441

(51) Int. Cl.
*A01F 15/07*    (2006.01)
(52) U.S. Cl.
USPC .................. 53/118; 53/587; 53/588; 53/210; 53/211
(58) Field of Classification Search
CPC ................ A01F 2015/0755; A01F 2015/0735; A01F 15/071
USPC .................. 53/116–118, 176, 587, 588, 210, 53/211

IPC ........... B65B 63/04, 11/04, 27/12; A01F 15/07, A01F 15/08

See application file for complete search history.

(56) References Cited

U.S. PATENT DOCUMENTS

| | | | |
|---|---|---|---|
| 3,722,197 A | 3/1973 | Vermeer | |
| 4,685,270 A * | 8/1987 | Brambilla | ........................ 53/176 |
| 5,822,967 A | 10/1998 | Hood et al. | |
| 6,405,510 B1 * | 6/2002 | Viaud | ............................. 53/118 |
| 6,901,719 B2 * | 6/2005 | Viaud | ............................. 53/118 |
| 7,156,015 B2 * | 1/2007 | McHale et al. | ................. 100/89 |

(Continued)

FOREIGN PATENT DOCUMENTS

| | | |
|---|---|---|
| DE | 4243406 A1 * | 7/1994 |
| EP | 543145 A2 * | 5/1993 |

(Continued)

OTHER PUBLICATIONS

International Search Report of PCT/NL2010/000151 issued on Jan. 14, 2011, 3 pages.

*Primary Examiner* — Stephen F Gerrity
(74) *Attorney, Agent, or Firm* — Hoyng Monegier LLP; Coraline J. Haitjema; David P. Owen

(57) ABSTRACT

An agricultural system for wrapping bales includes a baling device to form a cylindrical bale in a baling chamber, and a wrapping device to wrap the bale in wrapping material. The wrapping device includes a wrapping table to support the bale during wrapping, as well as a wrapping mechanism, and a transfer device to transfer a bale ejected from the baling chamber to the wrapping table. The transfer device includes a pivotable support to support a bale. The pivotable support is at least pivotable between a receive position to receive a bale from the baling chamber, and a release position, wherein the bale is released on the wrapping table.

14 Claims, 4 Drawing Sheets

(56) References Cited

U.S. PATENT DOCUMENTS

| | | | |
|---|---|---|---|
| 7,166,808 B2* | 1/2007 | Viaud et al. | 177/1 |
| 8,261,512 B2* | 9/2012 | Gette et al. | 53/118 |
| 2003/0024407 A1 | 2/2003 | Ehrenpfort et al. | |
| 2003/0070392 A1* | 4/2003 | Lacey | 53/587 |
| 2006/0000193 A1* | 1/2006 | Naeyaert et al. | 53/587 |
| 2007/0081878 A1* | 4/2007 | McHale et al. | 414/24.5 |
| 2008/0264031 A1* | 10/2008 | McHale et al. | 53/211 |
| 2009/0249746 A1* | 10/2009 | Viaud | 53/588 |

FOREIGN PATENT DOCUMENTS

| | | | |
|---|---|---|---|
| EP | 983720 A1 | | 3/2000 |
| EP | 1138189 A2 | * | 10/2001 |
| EP | 1266562 A1 | | 12/2002 |
| EP | 1273218 A1 | | 1/2003 |
| EP | 1077025 A1 | | 2/2003 |
| EP | 1726204 A1 | | 11/2006 |
| EP | 2050330 A1 | * | 4/2009 |
| EP | 2090153 A1 | | 8/2009 |
| FR | 2658985 A1 | * | 9/1991 |
| GB | 2169551 A | | 7/1986 |
| GB | 2221203 A | | 1/1990 |
| JP | 2000326909 A | * | 11/2000 |
| JP | 2006246729 A | * | 9/2006 |
| WO | WO 9014756 A1 | * | 12/1990 |

\* cited by examiner

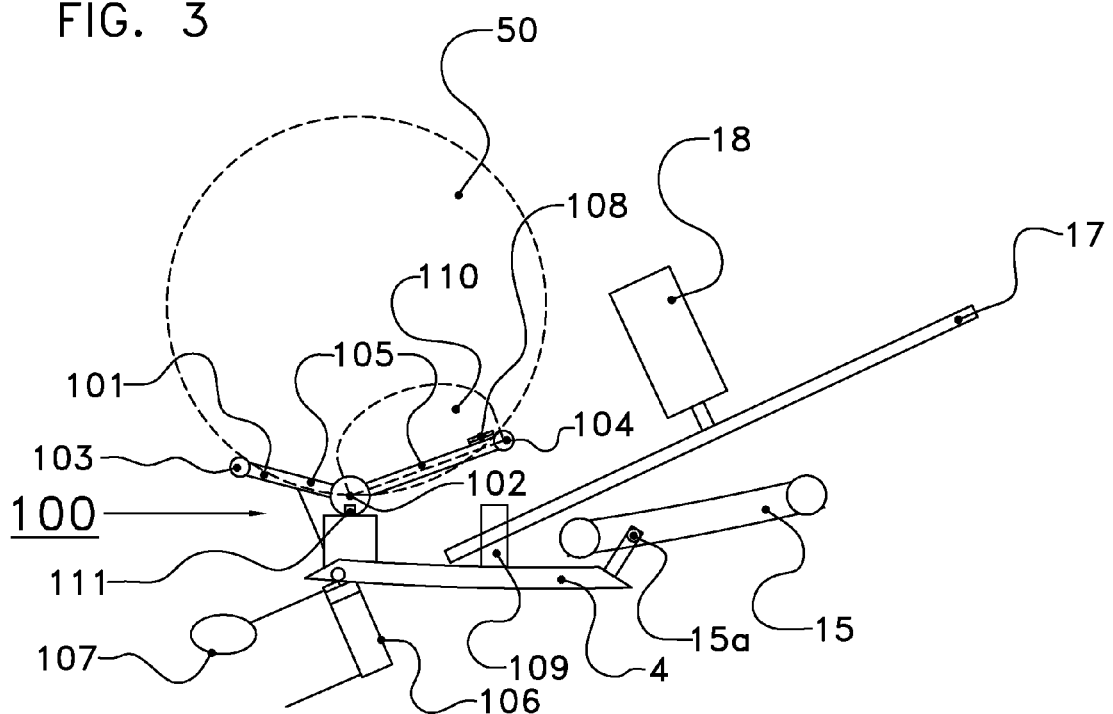
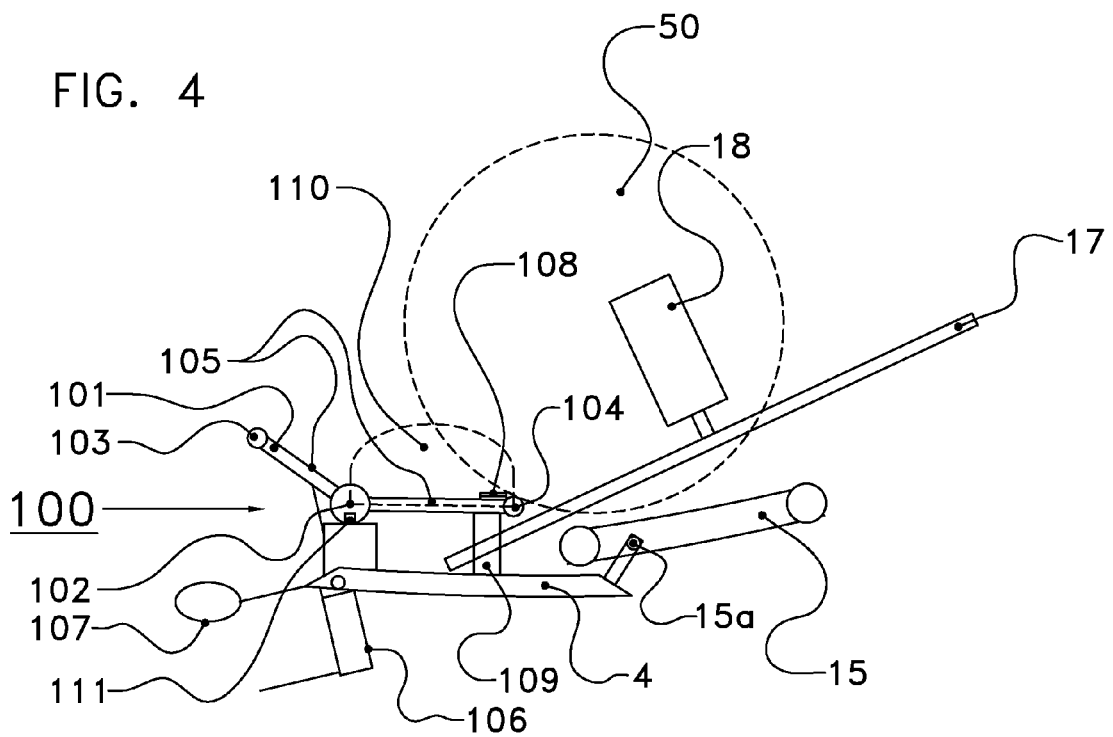

AGRICULTURAL SYSTEM TO FORM AND WRAP BALES OF CROP MATERIAL

CROSS REFERENCE TO RELATED APPLICATIONS

This application is a continuation of PCT application number PCT/NL2010/000151 filed on 21 Oct. 2010, which claims priority from Netherlands application number 1037441 filed on 4 Nov. 2009. Both applications are hereby incorporated by reference in their entireties.

BACKGROUND OF THE INVENTION

1. Field of the Invention

The present invention relates to an agricultural system for forming and wrapping bales of crop material.

2. Description of the Related Art

Different types of combined baling and wrapping devices are for instance disclosed in U.S. Pat. No. 5,822,967, EP 1 077 025, and EP 1 726 204 all incorporated herein by reference in their entireties.

The agricultural unit of EP 1 726 204 comprises a baling device and a swing arm bale wrapping device. The baling device comprises bale forming means to form a bale in baling chamber. The baling device comprises further a pivotable rear flap to open the baling chamber after formation of a bale in order to make removal of the bale from the baling chamber possible. After forming a bale, the bale is transferred to a wrapping device to wrap the bale in wrapping material, typically film material.

The wrapping device comprises a wrapping table to support the bale during wrapping and wrapping means to wrap the wrapping material on the bale. The wrapping means comprise one or more movable parts, for instance roll supporting devices to be rotated during wrapping around the bale supported on the wrapping table to wrap wrapping material, for instance a plastic film about the bale.

In the agricultural unit of EP 1 726 204 a transfer device is provided which passes bales from the baling device to the wrapping table of the wrapping device. The transfer device comprises a sheet metal table and a swiveling yoke which rolls the bale over the sheet metal table to the wrapper. The bale is rolled uphill to its highest point, from which it falls into a recess in the wrapping table. Due to the lifting of the bale during transfer there arise problems during uphill work of the baler because the bale is too much accelerated and can run over the wrapping table.

A drawback of the transfer device of EP 1 726 204 is that the transfer process of the bale may be dependent on the angle of the agricultural unit with respect to a horizontal plane.

Furthermore, the presence of the transfer device also places restriction on the space available for the wrapping device. In particular less space may be available for the provision and movement of the one or more movable parts of the wrapping device, for instance roll supporting devices to be rotated during wrapping around the bale.

BRIEF SUMMARY OF THE INVENTION

It is an object of the invention to provide an agricultural system to form and wrap bales of crop material, comprising an alternative transfer device to transfer bales ejected from the baling chamber to the wrapping table of the wrapping device.

The aim of the invention is achieved with an agricultural system, comprising:
  a baling device comprising bale forming means (e.g., bale forming mechanism) to form a bale in a baling chamber,
  a wrapping device to wrap the bale in wrapping material, the wrapping device comprising a wrapping table to support the bale during wrapping and wrapping means, and
  a transfer device to transfer a bale ejected from the baling chamber to the wrapping table,
wherein the transfer device comprises a pivotable support to support a bale, which pivotable support is at least pivotable between a receive position to receive a bale from the baling chamber, and a release position, wherein the bale is released on the wrapping table.

A pivotable support according to the invention is in particular suitable for transfer of the bale when the baling chamber is at a higher level than the wrapping table. In such construction, the bale may be transferred by gravity. However, when the bale is transferred directly to the wrapping table, the forces on the wrapping table may become too large. Furthermore, the transfer of the bale from the baling chamber to the wrapping table may substantially be influenced by a tilted position of the agricultural position, for instance when driving the agricultural system in a hilly area.

The provision of a pivotable support which receives the bale from the baling chamber and then transfers the bale to the wrapping table provides better control over the transfer of a bale, in particular in hilly areas. In uphill driving of the agricultural system the acceleration of the bale can be decreased by the pivotable support.

Furthermore, by receiving the bale in the pivotable support before transfer to the wrapping table decreases the forces with which the bale lands on the wrapping table.

Another advantage of the transfer device of the invention compared with the transfer device of EP 1 726 204 is that the bale does not have to be pushed and rolled during transfer, since the bale is completely supported by the pivotable support.

In an embodiment, a driving device, preferably a hydraulic actuator, is provided to actively move the pivotable support from the receive position to the release position. By moving the pivotable support actively by a driving device between the receive position and the release position the transfer of the bale can be controlled in an accurate way. By this active actuation the influence of gravity on the transfer of the bale may further be decreased.

In an embodiment, the wrapping means (e.g., wrapping mechanism) comprise one or more movable parts to be rotated during wrapping along a trajectory around the bale supported on the wrapping table, wherein the pivotable support, when placed in the receive position, is at least partially located in the trajectory of the one or more movable parts, and wherein the pivotable support may be arranged in a wrapping position, wherein the pivotable support is located outside the trajectory of the one or more movable parts.

By making it possible to pivot the pivotable support in a third so-called wrapping position, i.e. the position during wrapping, space can be made available for the movable parts of the wrapping device. This extra space may especially be advantageous in compact designs of baling and wrapper device, and/or in wrapping devices comprising one or more roll support devices to support wrapping material rolls, and a carrying structure to carry the one or more roll support devices, wherein the carrying structure is arranged below the one or more roll support devices.

During actual wrapping of a bale, the pivotable support will be in the wrapping position. After finishing the actual wrapping process and before a bale is ejected from the baling chamber, the pivotable support is moved to the receive position. When a bale is received by the pivotable support, it is moved to the release position to release the bale on the wrapping table. After release of the bale, the pivotable support can be pivoted back to the wrapping position to avoid that the wrapping process is hindered by the presence of the pivotable support.

In an embodiment, the driving device is configured to actively move the pivotable support from the release position to the receive position or the wrapping position. By actively moving the pivotable support structure from the release position to the receive or wrapping position, this movement can be accurately controlled.

In an embodiment, the transfer device comprises a biasing element which biases the pivotable support to the receive position or the wrapping position. In such embodiment no extra active driving mechanism or extra hydraulic valve has to be provided to bring the pivotable support back to receive position or the wrapping position. Such biasing element may comprise a spring or other mechanical biasing element. Preferably, the biasing element is a hydraulic accumulator.

In an embodiment, the pivotable support comprises a sensor to detect the presence of a bale on the pivotable support. By locating a sensor, for instance a force sensor, on the pivotable support which sensor is able to measure the presence of a bale on the pivotable support, reliable operation of the transfer device can be obtained, since the pivotable support will only be activated when a bale is present on the pivotable support.

In an alternative embodiment, a sensor may be provided in the pivotable rear flap of the baling device to measure a position of the pivotable rear flap. Activation of the driving device can be based on the position of the pivotable rear flap. Preferably, the sensor is an angle sensor configured to measure an angular position of the pivotable rear flap. For instance when the rear flap is opened at 60% to 90%, for instance 75% of maximum opening, the driving device may be activated to pivot the pivotable support from the receive position to the release position. By making the activation of the pivotable support dependent on the angular position of the rear flap of the baling chamber, the motion of the pivotable support can be accurately planned in the process scheme of the agricultural system. In an embodiment a combination of an angle sensor in the rear flap and a sensor to detect the presence of a bale on the pivotable support or an angle sensor for the pivotable support may also be provided.

In an embodiment, stopping means, e.g. stoppers, are provided on a frame of the agricultural system, wherein in the release position the pivotable support rests against the stop means. By providing such stop means the weight of the bale during transfer from the pivotable support to the wrapping table is mainly carried by the pivotable support and directly transferred to the frame. The forces on the wrapping table are therewith advantageously reduced.

In an embodiment, the pivotable support comprises two side plates at opposite sides of the pivotable support to guide the sides a bale supported on the pivotable support. These guiding side plates improve the control over the correct transfer of the bale from the baling chamber to the wrapping table.

It is remarked that, unless mentioned otherwise, terms referring to a relative position, such as above, below, tilted etc. are used to describe the positions of the parts of the agricultural system of the invention, while the agricultural position is in its normal upright position supported on a horizontal underground.

BRIEF DESCRIPTION OF THE DRAWINGS

The features and advantages of the invention will be appreciated upon reference to the following drawings, in which:

FIGS. 3, 4 and 5 show different positions of an embodiment of a transfer device of the invention in side view.

DESCRIPTION OF ILLUSTRATIVE EMBODIMENTS

Figure 1:
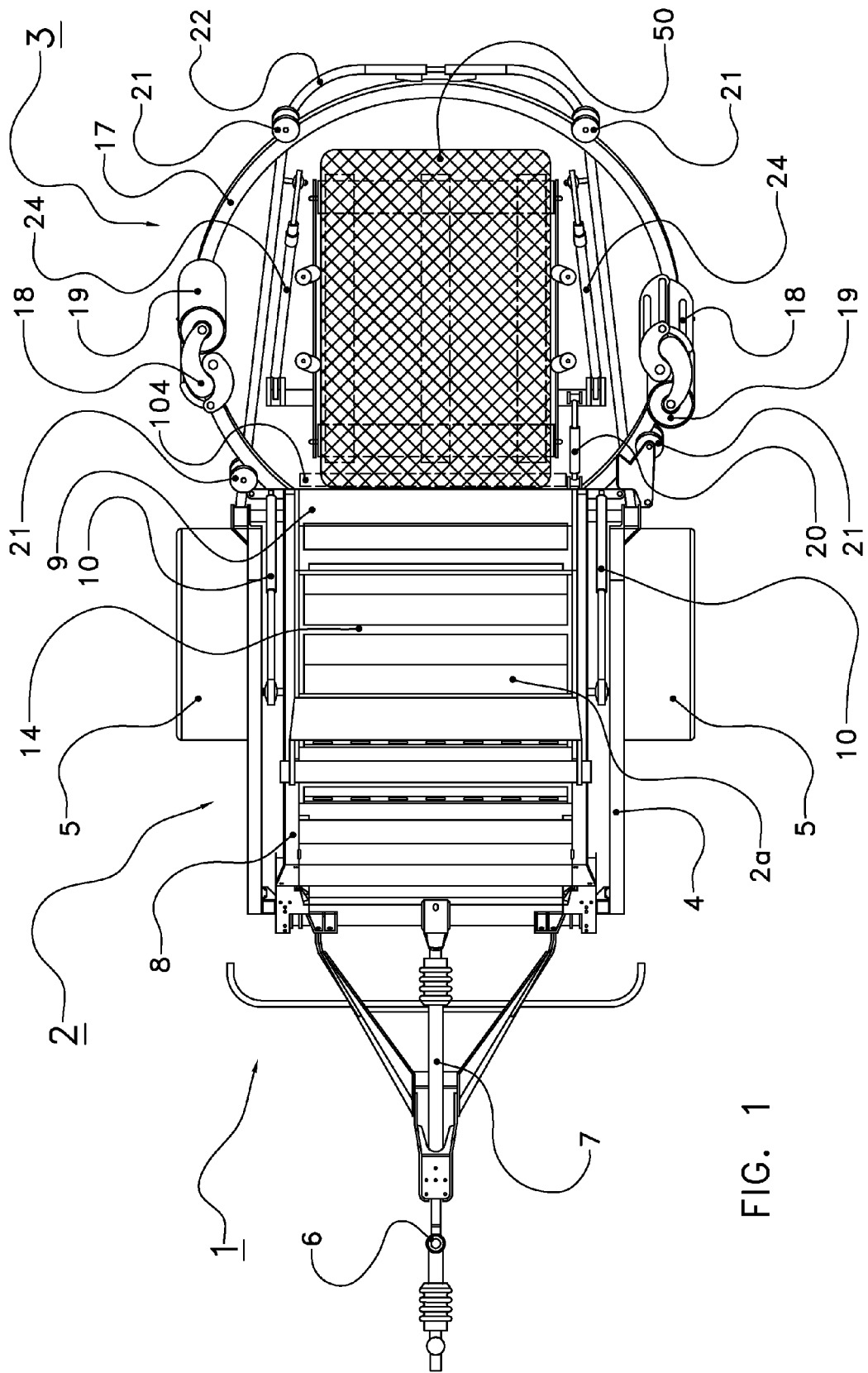
FIG. 1 shows a top view of an agricultural unit according to the invention.
Figure 2:
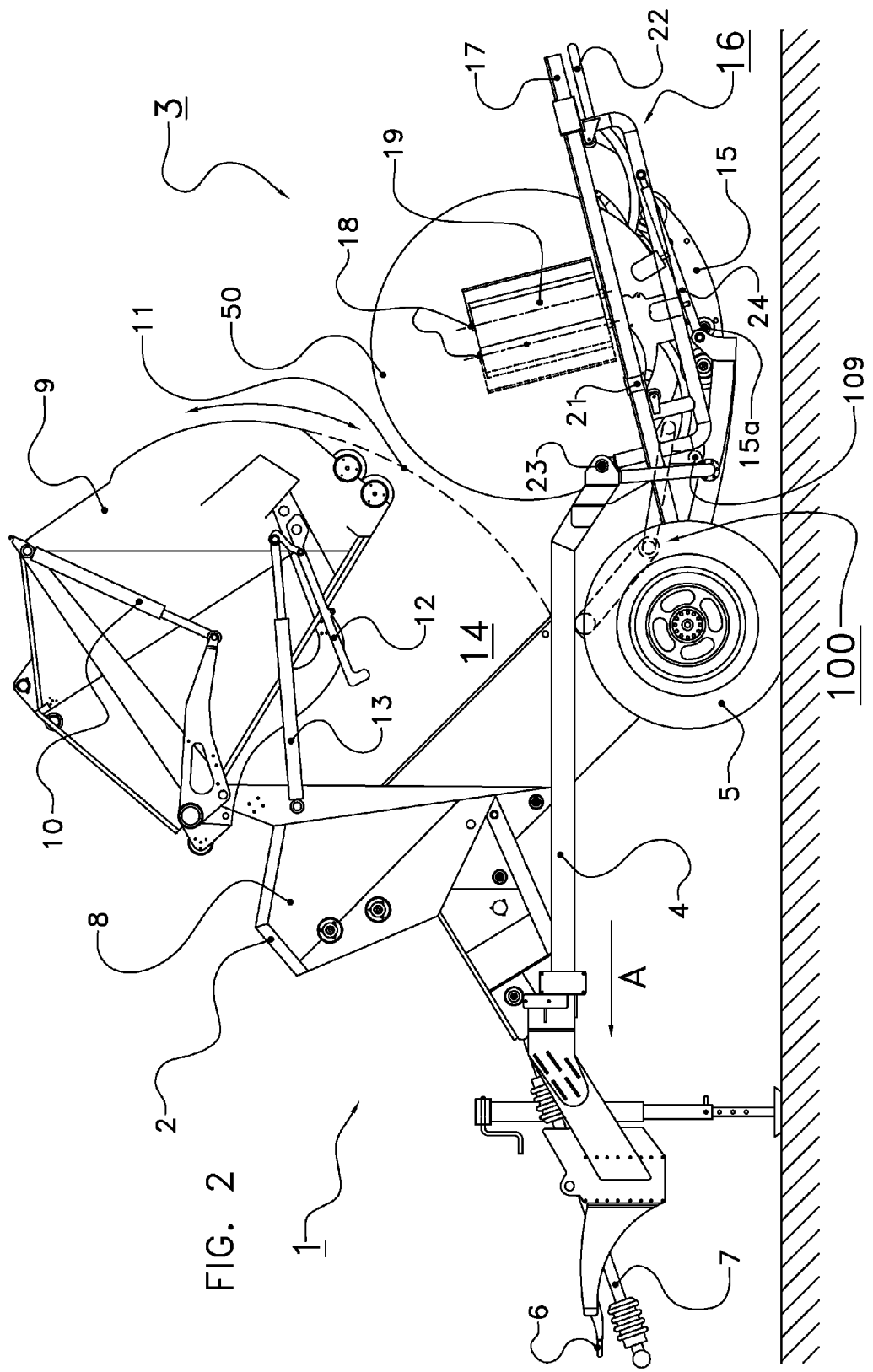
FIG. 2 shows a side view of the agricultural unit of FIG. 1 after receipt of a bale on the wrapping table.

The following is a description of certain embodiments of the invention, given by way of example only and with reference to the drawings. FIG. 1 shows, in top view, an agricultural unit according to the invention which is generally indicated with the reference numeral 1. The agricultural unit 1 comprises a baling device 2 and a wrapping device 3, and is configured to form and wrap bales of crop material. FIG. 2 shows a side view of the agricultural unit 1 of FIG. 1.

The baling device 2 and the wrapping device 3 are mounted on a frame 4 which is supported by a pair of wheels 5. The front end 6 of the frame 4 is configured to be connected to a tractor, or other machinery configured to move the agricultural unit in an intended driving direction, indicated by an arrow A. A drive axle 7 is provided to be connected to the pulling vehicle for driving respective parts of the agricultural unit 1.

The wrapping device 3 is partly located below the baling device 2 to obtain a compact design.

The baling device 2 comprises a stationary part 8 and a pivotable rear flap 9. The pivotable flap 9 is pivotable about a pivot point arranged at the top side of the stationary part 8 and the pivotable rear flap 9. A hydraulic cylinder 10 is provided to pivot the rear flap 9 between an opened and a closed position. During movement of the pivotable flap 9 between the closed and opened position, the pivotable rear flap follows the trajectory 11.

The baling device 2 further comprises a locking arm 12 which is configured to hold the stationary part 8 and the pivotable rear flap 9 together when the pivotable rear flap 9 is in the closed position. A hydraulic cylinder 13 is provided to move the locking arm 12 between a locking position in which the stationary part 8 and the pivotable rear flap 9 are held together, and a non-locking position wherein the pivotable rear flap 9 is not prevented to pivot to its opened position.

The baling device 2 comprises a baling chamber 14 in which the bale 50 may be formed by use of baling means 2a comprising rolls and bands to rotate and press the crop material to form a bale 50. The baling chamber 14 is a variable baling chamber configured to form round bales of crop material of different diameters, for instance 80, 100, 130 and 160 cm in diameter. For further details on an embodiment of a baling device having a variable baling chamber reference is made to U.S. Pat. No. 3,722,197, which is hereby incorporated by reference in its entirety. Other types of baling devices having a variable baling chamber may also be applied. In an alternative embodiment, the baling chamber 14 may be configured to form bales with constant diameter.

The wrapping device 3 is configured to wrap a bale 50 in wrapping material, typically plastic film material provided on rolls. The film material is wrapped about the bale 50 to cover the outer surface of the bale 50.

The wrapping device 3 comprises a wrapping table 15 which supports the bale 50 during wrapping and a wrapping means 16. The wrapping table is configured to rotate the supported bale 50 about its cylindrical axis during wrapping.

The wrapping table 15 is pivotable about pivot axis 15a between different positions. A hydraulic cylinder 20 is provided to pivot the wrapping table 15 between the different positions.

Figure 5:
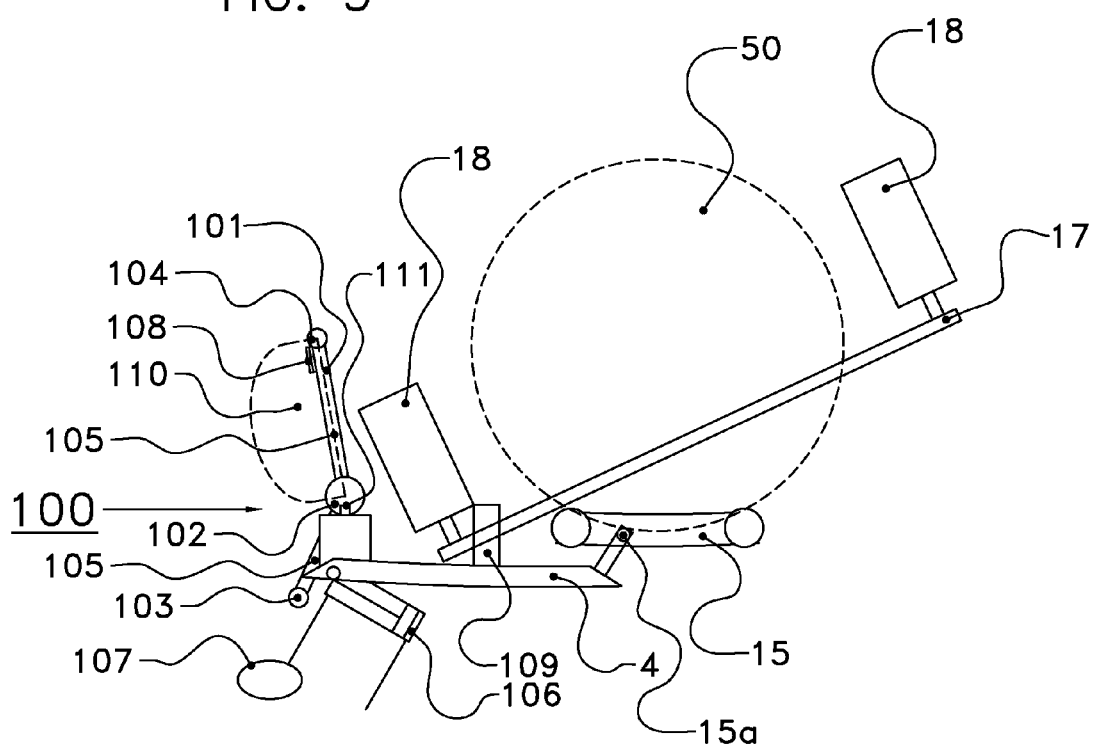

The wrapping table 15 can be placed in a receiving position (FIGS. 2 and 3) to receive a bale 50 from the baling chamber 14. During wrapping the wrapping table 15 is placed in the wrapping position as shown in FIG. 5. When a bale 50 is wrapped and to be released from the wrapping device 3, the wrapping table is brought into the release position in which the bale rolls backwards from the wrapping table 15.

In the wrapping position the wrapping table is positioned in an angle of 0 degrees with the horizontal plane. In the receiving position the wrapping table 15 is pivoted 20 degrees towards the baling device 2, while in the release position the wrapping table 15 is pivoted 20 degrees away from the baling device 2.

The wrapping means 16 comprises a ring 17 supporting two roll support devices 18 each configured to support a roll of wrapping material 19. The ring 17 is movably supported by a number of rollers 21 mounted on a carrying structure 22. The ring 17 is rotatable during wrapping in order to move the rolls of wrapping material 19 about the bale 50 supported on the wrapping table 15. The carrying structure 22 is mounted under the ring 17.

The wrapping means may further comprise a non-shown clamping and cutting device to clamp and cut the wrapping material between the bale 50 and the rolls of wrapping material 19 at the end of the wrapping of the bale 50.

The wrapping means are arranged at an inclination angle with respect to the horizontal plane, whereby the part below the baling device 2 is the closest to the ground. As a result the trajectory of the moving parts of the wrapping device 3, such as the rotatable ring 17 and roll support devices 18 is also inclined with the angle $\alpha$ with respect to the horizontal plane.

During wrapping the angle $\alpha$ will be in the range 5 to 45 degrees, preferably between 10 to 30 degrees.

The wrapping means 16 can be rotated with respect to the frame 4, since the carrying structure 22 is pivotably mounted on a pivot axis 23 which is arranged parallel to the pivot axis 15a. A hydraulic cylinder 24 is provided to pivot the carrying structure 22 between different positions. The carrying structure 22 is at least pivotable between a wrapping position in which the wrapping means 16 are positioned to wrap a bale 50 supported on the wrapping table 15, as shown in FIG. 5, a release position, wherein a bale 50 can pass through the ring 17 in order to be released from the wrapping device 3.

In the release position the angle may be 40 to 90 degrees with respect to a horizontal plane, preferably 50 to 70 degrees.

A transfer device 100 is provided to transfer a bale 50 ejected from the baling chamber 14 to the wrapping table in a controlled manner. The transfer device 100 will now be described in more detail with reference to the drawings 3, 4 and 5.

The transfer device 100 comprises a pivotable support 101 which is pivotable about a pivot axis 102. The pivotable support 101 comprises two support bars 103 and 104 on which a bale 50 can be supported. The support bars 103 are connected to each other with further bars 105. The pivot axis 102 is located in vertical direction at such a distance below the baling chamber 14 that the bale makes mainly a downward movement during transfer on the wrapper table 15. The axis 102 is located in horizontal direction between the axis of the wheels 5 and the ring 17.

Any other pivotable construction capable of carrying a bale may also be used as pivotable support.

In FIG. 3, the pivotable support 101 is held in the receive position by a hydraulic actuator 106. The hydraulic actuator 106 is connected to a hydraulic pressure source, for instance a hydraulic pump of the pulling vehicle pulling the agricultural unit 1. A valve is provided to control pressurization of the hydraulic actuator 106. A hydraulic accumulator 107 is connected to the pressure chamber of the hydraulic actuator 106.

The hydraulic actuator 106 is arranged to move, upon actuation, the pivotable support 101 from the wrapping position (FIG. 5) to the receive position (FIG. 3) to receive a bale from the baling chamber 14, and, after receipt of a bale 50, to move the pivotable support 101 from the receive position (FIG. 3) to the release position (FIG. 4), where the bale is released on the wrapping table 15.

When the bale 50 is released from the pivotable support 101, the accumulated pressure in the hydraulic accumulator 107 moves the pivotable support 101 back to the wrapping position. The pivotable support 101 is positioned in this wrapping position to take the pivotable support 101 out of the trajectory of the roll support devices 18.

It is remarked that when the pivotable support 101 positioned in the receive position, is not in the trajectory of the roll support devices 18 and/or any other moving parts of the wrapping means 16, the wrapping position may be omitted. In such embodiment the transfer device 100 may only be pivoted between the receive position to receive bales from the baling chamber 14 and a release position to release the bale on the wrapping table 15.

A sensor 108 is provided on the pivotable support 101 to detect the presence of a bale on the pivotable support 101. This sensor 108 can be used to determine the moment that the pivotable support 101 can be moved form the receive position to the release position. Alternatively, an angle sensor (111) could be used to detect a position of the pivotable support (101).

As an alternative or in addition thereto, there may be provided an angle sensor to measure the angle of opening of the pivotable rear flap 9. The movement of the pivotable support 101 from the receive position to the release position may be started when the rear flap 9 is opened over a certain angle. For instance the pivotable support 101 may be moved to the release position when the rear flap is opened for 75% of its total opening angle.

In the release position (FIG. 4), the pivotable support 101 rests on stop elements 109. These stop elements 109 are arranged on the frame of the wrapping device, but may also be arranged on any other frame or support construction capable of supporting the pivotable support 101 and the bale supported thereon. The advantage of the stop means is that the force exerted by the bale is transferred to the frame. In this way the maximum force on the wrapping table 15 is decreased, since a substantial part of the potential energy of the bale is absorbed by the pivotable support 101 and the stop elements 109.

In the shown embodiment, side plates 110 are arranged on the pivotable support 101 to provide support to the sides of the bale 50.

Now will be described how a bale 50 may be formed and wrapped in a agricultural unit 1 according to the invention.

To form a bale 50 of crop material, the baling device 2 comprises a pick-up device (not shown) for picking crop material from an underground over which the agricultural unit 1 is moved. The crop material is introduced into the baling chamber 14 to form a bale 50 of crop material by pressing and rotating the crop material into a cylindrical form until a bale 50 of the desired diameter or density is formed.

One of ordinary skill in the art will appreciate that pick up devices are well known in the art. A baler is provided with a rotary driven pick-up that comprises an elongate drum that is oriented transversely to the direction of travel. The drum comprises a large number of so-called tine arms that extend away from the drum and pick-up crop material from the ground as they are driven in rotation. Located downstream of the pick-up is a large rotor that chops the crop material into smaller pieces and takes care of transporting the material towards the bale chamber. Such pick-up devices are known from for example GB2169551 and EP 1273218 both references of which are hereby incorporated by reference in their entireties.

Since considerable forces are used to form the bale 50 in the baling chamber 14, the locking arm 12 is held in the locking position to hold the stationary part 8 and the pivotable rear flap 9 together.

When a bale 50 of a desired diameter has been formed the baling process is stopped and the pivotable rear flap 9 is opened to release the bale 50 from the baling chamber 14. For opening of the baling chamber the locking arm 12 is brought into the unlocked position. Furthermore, the transfer device 100 is brought from the wrapping position to the receive position before the bale 50 is free to roll from the baling chamber 14.

When the rear flap 9 is sufficiently opened for release of the bale, the bale 50 will due to gravity roll from the baling chamber 14 to the transfer device 100. The bale 50 falls on the pivotable support 101 which is located in the receive position.

When the presence of a bale on the pivotable support 101 is detected by sensor 108, the pivotable support 101 is moved by the hydraulic actuator 106 from the receive position to the release position. Before this movement, the wrapping table 15 is placed in the receiving position to receive the bale 50.

When the pivotable support 101 is in the release position the bale 50 will roll on the wrapping table 15. Since the pivotable support 101 rests on the stop elements 109 a substantial part of the forces is transferred to the frame and not exerted on the wrapping table 15. As soon as the bale is no longer is supported on the pivotable support 101, the pivotable support 101 is moved back to the wrapping position where is does not interfere with the trajectory of the roll support devices 18. This movement back to the wrapping position is caused by the hydraulic accumulator 107.

After the wrapping table 15 is pivoted to the wrapping position, the wrapping process may be started.

For wrapping a bale 50 of crop material the bale 50 is supported on the wrapping table 15 while the ring 17 with the roll support devices 18 is rotated about the bale 50 in order to wrap the wrapping material on the bale 50. At the same time, the bale 50 is rotated about its cylindrical axis, so that different parts of the bale 50 are aligned with the rolls of wrapping material in order to wrap the complete surface of the bale 50 in wrapping material.

After wrapping, the wrapped bale 50 is ready to be released on the ground. To release the bale 50, the wrapping table 15 and the wrapping means 16 may each be pivoted to the release position. In the release position of the wrapping table 15, the bale 50 rolls off the wrapping table to the ground. The bale 50 goes through the ring 17 of the wrapping device 3 as the ring 17 has been pivoted together with the wrapping means 16 to the release position.

Hereinabove a wrapping means 16 has been described comprising a rotatable ring 17 and roll support devices 18. In an alternative embodiment the wrapping means may comprise a stationary guiding ring which is configured to guide the roll supporting devices about the bale 50. Any other suitable type of wrapping means may also be applied.

Hereinabove, an agricultural unit 1 has been described wherein the baling device 2 and the wrapping device 3 are arranged on a single frame 4. In an alternative embodiment, the baling device 2 and the wrapping device 3 may be arranged at independently supported frames which are coupled to form an agricultural system according to the invention.

Furthermore, a baling device with a variable baling chamber has been described. It is remarked that the transfer device according to the invention may also be applied in a baling device having a baling chamber with fixed diameter. Further modifications in addition to those described above may be made to the structures and techniques described herein without departing from the spirit and scope of the invention. Accordingly, although specific embodiments have been described, these are examples only and are not limiting upon the scope of the invention.

What is claimed is:

1. An agricultural system comprising:
    a baling device comprising bale forming mechanism to form a cylindrical bale in a baling chamber,
    a wrapping device to wrap the bale in wrapping material, the wrapping device comprising a wrapping table to support the bale during wrapping and a wrapping mechanism, and
    a transfer device to transfer the bale ejected from the baling chamber to the wrapping table,
    wherein the transfer device comprises a pivotable support to support the bale, which pivotable support is at least pivotable between a receive position to receive the bale from the baling chamber, and a release position, wherein the bale is released on the wrapping table; and
    wherein the wrapping mechanism comprises one or more movable parts to be rotated during wrapping along a trajectory around the bale supported on the wrapping table, wherein the pivotable support, when placed in the receive position, is at least partially located in the trajectory of the one or more movable parts, and wherein the pivotable support may be arranged in a wrapping position, wherein the pivotable support is located outside the trajectory of the one or more movable parts.

2. The agricultural system of claim 1, wherein a driving device is provided to actively move the pivotable support from the receive position to the release position.

3. The agricultural system of claim 2, the driving device is a hydraulic actuator.

4. The agricultural system of claim 1, wherein a driving device is configured to actively move the pivotable support from the release position to the receive position or the wrapping position.

5. The agricultural system of claim 1, wherein the transfer device comprises a biasing element which biases the pivotable support to the receive position or the wrapping position.

6. The agricultural system of claim 5, wherein the biasing element is a hydraulic accumulator.

7. The agricultural system of claim 1, wherein the pivotable support comprises a sensor to detect the presence of a bale on the pivotable support.

8. The agricultural system of claim 1, wherein the baling device includes a pivotable rear flap to open the baling chamber, wherein a sensor is provided to measure a position of the pivotable rear flap, and wherein activation of a driving device is based on the position of the pivotable rear flap.

9. The agricultural system of claim 1, wherein one or more stoppers are provided on a frame of the agricultural system, and wherein in the release position the pivotable support rests against the stopper.

10. The agricultural system of claim 1, wherein the pivotable support comprises a cradle to support the bale.

11. The agricultural system of claim 10, wherein the cradle is formed by at least two support bars running substantially parallel to a rotational axis of the cylindrical bale to be supported.

12. The agricultural system of claim 1, wherein the pivotable support comprises two side plates at opposite sides of the pivotable support to guide the sides of the bale supported on the pivotable support.

13. The agricultural system of claim 1, wherein the pivotable support comprises an angle sensor to detect a position of the pivotable support.

14. The agricultural system of claim 1, wherein a pivot axis of the pivotable support is arranged below the baling chamber and outside of a trajectory of the one or more moveable parts.

* * * * *